Dec. 29, 1959  M. H. KRUGER  2,918,995
JOINTS AND METHOD OF MAKING JOINTS
Filed July 26, 1956  2 Sheets-Sheet 1
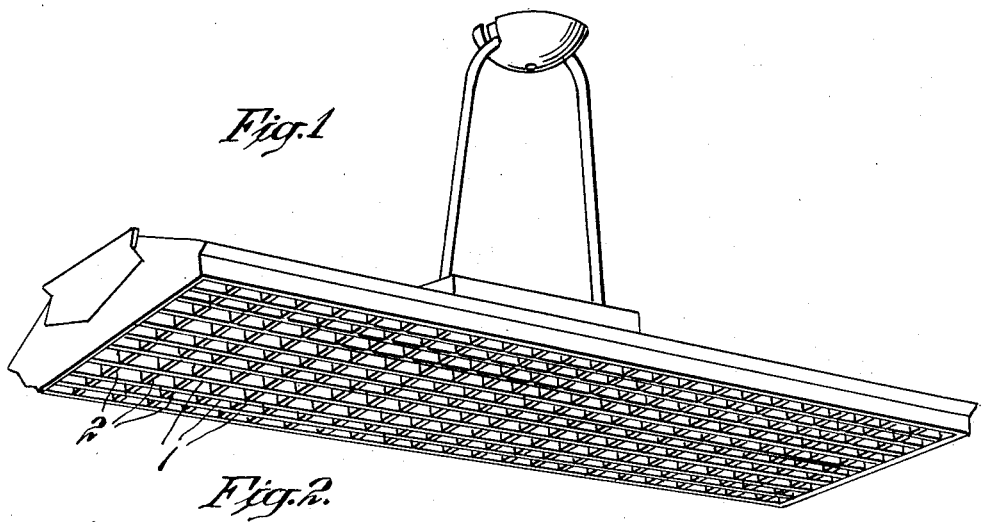
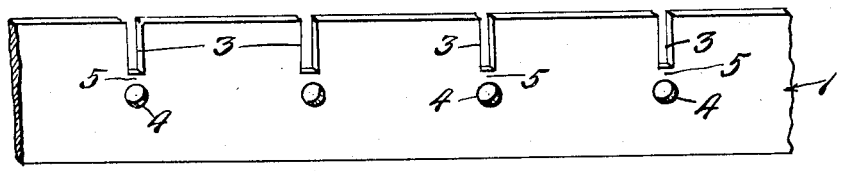
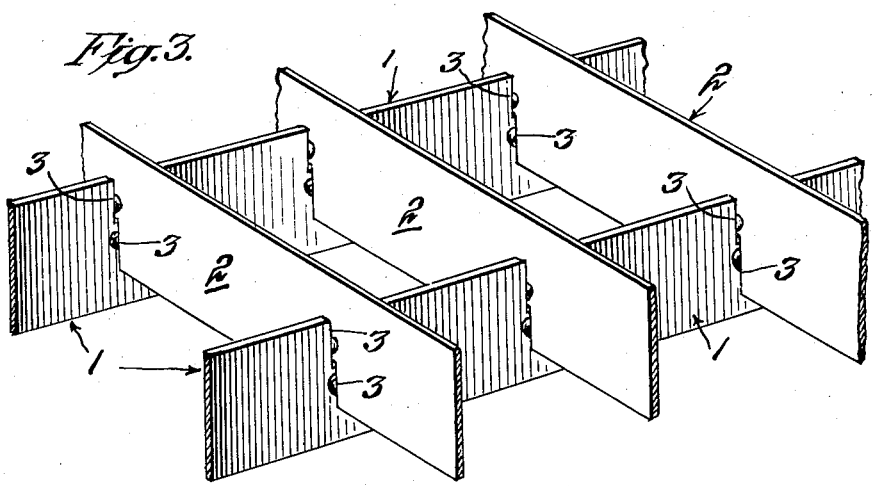
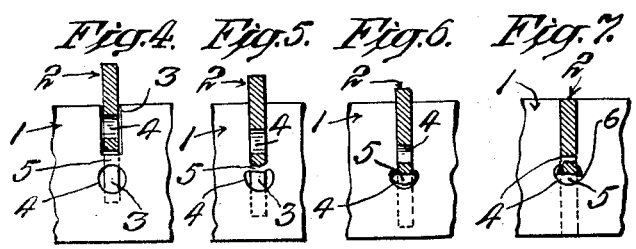
INVENTOR.
MICHAEL HENRY KRUGER
BY Gustav Crews
his ATTORNEY Dec. 29, 1959     M. H. KRUGER     2,918,995
JOINTS AND METHOD OF MAKING JOINTS
Filed July 26, 1956     2 Sheets-Sheet 2
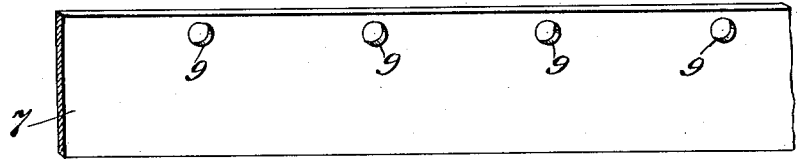
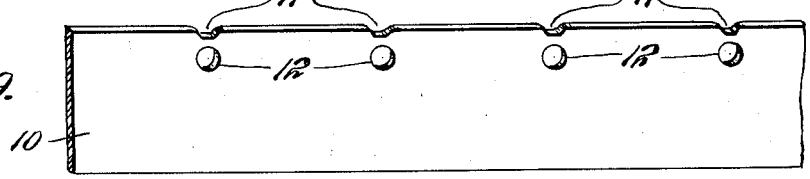
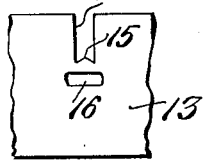 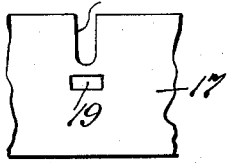 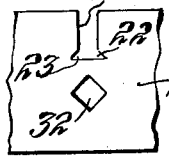 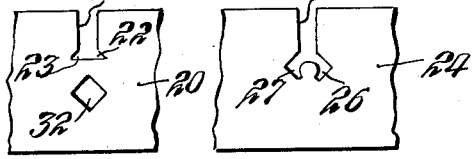
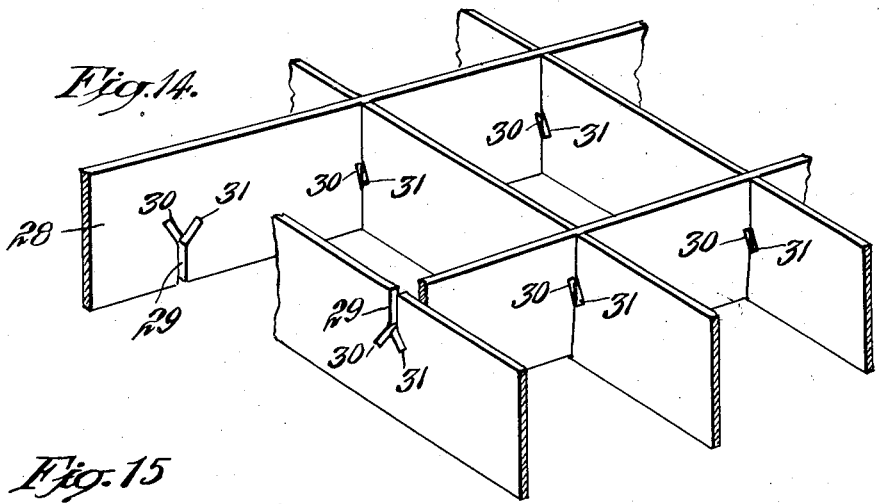
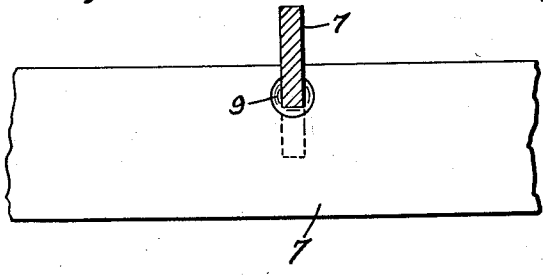
INVENTOR.
MICHAEL HENRY KRUGER
BY Gustav Drews
his ATTORNEY United States Patent Office 2,918,995
Patented Dec. 29, 1959

2,918,995

JOINTS AND METHOD OF MAKING JOINTS

Michael Henry Kruger, Chestnut Hill, Mass., assignor to Smithcraft Corporation, Chelsea, Mass., a corporation of Massachusetts Application July 26, 1956, Serial No. 600,202

5 Claims. (Cl. 189—82)

This invention relates to joints in general and more particularly to joints in multiple for gratings or egg crate louvers for use in lighting fixtures and the method of making the same.

Among the objects of the present invention, it is aimed to provide an improved joint for a grate or grating consisting of bars that cross one another which may be secured to one another without the use of extraneous fastening means such as solder or the like, or by means of welding, brazing or the like.

More specifically the present invention aims to provide an improved joint for a grate, grating or egg crate louver whereby the cross bars constituting the grate are notched or slit part way, or pierced juxtaposed to one another at the pierced, notched or slitted areas and then forced or swaged into locking or anchoring position with one another.

It is still another object of the present invention to provide an improved method for making joints for grates consisting in producing delineations intermittently along a set of longitudinally extending bars and a set of laterally extending bars, which delineations consist of piercings, indentations and the like, thereupon placing one set of bars upon the other set substantially at right angles to one another with the intermittent delineations of the longitudinally extending set registering with and facing the delineations of the laterally extending set, and thereupon exercising pressure upon the two sets of bars in opposition to one another causing portions of the bars to extrude and interlock with one another.

It is still another object of the present invention to provide a means for connecting two bars or plates to one another so that in their assembled form the bars or plates will form dihedral angles with one another, which connecting means consist of openings at the intersecting portions of the bars with a portion of each bar extruding into the opening of the other bar.

It is still another object of the invention to provide a means for connecting two plates to one another so that in their assembled form the plates will form dihedral angles with one another, which connecting means will be comparatively inexpensive and can be produced with a minimum of labor permitting the use of prefinished material.

In line with the latter object, it is also an object of the present invention to provide a method for connecting two plates to one another so that in their assembled form the plates will form dihedral angles with one another, which method will dispense with any extraneous connecting means, but rely mainly upon formations in the plates themselves to constitute the locking or anchoring means.

By means of this locking means and method, the cost of constructing a building structure, furniture and the like, obviously will be materially reduced.

These and other features, capabilities and advantages of the present invention will appear from the subjoined detailed description of specific embodiments thereof illustrated in the accompanying drawings, in which Fig. 1 is a perspective of a light fixture equipped with an egg crate louver made according to one embodiment of the present invention.

Fig. 2 is a fragmental side elevation of a bar cut according to one embodiment.

Fig. 3 is a perspective of two sets of bars nested preparatory to being forced into anchoring engagement with one another.

Figs. 4, 5, 6 and 7 are fragmental sections showing successive positions of the bars relative to one another after having previously been formed as shown in Fig. 2, when being forced into anchoring engagement with one another.

Figs. 8 and 9 are fragmental side elevations of bars made according to two additional embodiments.

Figs. 10, 11, 12 and 13 are fragmental side elevations of parts of bars made according to four more embodiments.

Fig. 14 is a fragmental perspective of two sets of bars made according to still another embodiment after the same have been forced into anchoring engagement with one another.

Fig. 15 is a fragmental cross section of bars made according to two additional embodiments as shown in Fig. 8, in assembled condition.

In the embodiment there are shown in Figs. 1 to 7, inclusive, the bars 1 and 2, composed of any suitable material such as a synthetic resinous plastic material, such as Lucite, polyvinyl chloride, or the like, or any other malleable plastic such as aluminum, steel, or the like, of about $\frac{1}{16}$ of an inch more or less in thickness for aluminum or steel, and $\frac{1}{8}$ of an inch more or less for a plastic material such as Lucite, polyvinyl chloride or the like.

It will be assumed that the bars 1 are the longitudinally extending bars, and the bars 2 are the cross bars. These bars 1, 2 in shape are substantially identical. When composed of Lucite as shown in Fig. 2, these bars 1, 2 are provided with slits 3 of about $\frac{3}{8}$ of an inch in length by about $\frac{9}{32}$ of an inch in width, when the width of the bars 1 and 2 is about $1\frac{1}{8}$ inches in width and about $\frac{1}{8}$ of an inch in thickness. Immediately beyond the slits 3, but spaced therefrom, there are formed the orifices or openings 4. The slits 3 are spaced from one another according to the design to be produced. If the design is the conventional egg crate louver extensively used today, then the average distance from one slit to the next will be about $1\frac{1}{4}$ inches. The openings 4 when circular as shown are preferably about $\frac{3}{8}$ of an inch in diameter when the width of the slits 3 is about $\frac{9}{32}$ of an inch. Furthermore, excellent results have been achieved when the openings 4 are spaced from the inner ends of the slits 3 by about $\frac{1}{4}$ of an inch. In the process of assembling, the cross bars 2 are nested into the bars 1 with their slits 3 in alinement with one another. Thereupon the bars 1 and 2 so nested are preferably placed in a press and forced toward one another, when the material 5, see Fig. 2, will distort and spread outwardly to form the projections 6 shown in Fig. 7, see the successive progress shown in Figs. 4 to 7 inclusive.

Tests have shown that when the bars 1 and 2 are formed as shown by the bar 7 in Fig. 8 with a plurality of openings 9, and the complemental bars are positioned so that their respective openings 9 register with one another, the bars so formed may similarly be anchored to one another in the form of a grate or grating.

In Fig. 9 the bar 10, in place of the bars 1 and 2, is provided with notches 11 and openings 12 to take the place of the slits 3 and openings 4 of the embodiment illustrated in Fig. 2.

In Fig. 10 the bar 13 is shown with a slot or slit 14 having a raised portion 15 at the bottom of the slot or slit 14 and an oblong or rectangular opening 16 disposed below the lower end of the slot or slit 14, the opening 16 being longer than the width of the slot or slit 14.

In Fig. 11 the bar 17 differs from the bar 1 in that the slot or slit 18 is rounded at the bottom, and the opening 19 is definitely is rectangular.

In Fig. 12 the bar 20 differs from the bar 1 in that the slot or slit 21 has outwardly extending recesses 22 and 23 at the lower end thereof and the opening 32 is located with one of the angles pointed toward the bottom or lower end of the slot or slit 21.

In Fig. 13 the bar 24 there shown differs from the bar 1 in that the slot or slit 25 has two claw shaped extensions 26 and 27 to replace the openings 4 of the bar 1.

In Fig. 14 the bar 28 distinguishes from the bar 1 in that the slot or slit 29 is provided with two extensions 30 and 31 forming a Y shape as shown, the extensions 30 and 31 taking the place of the openings 4.

It is obvious that various changes and modifications made be made to the details of construction without departing from the general spirit of the invention as set forth in the appended claims.

I claim:
1. The method of forming a grate constituting the louver of a lighting fixture consisting in producing slots spaced from one another receding from one edge in each bar of a set of longitudinally extending bars and each bar of a set of laterally extending bars, forming orifices in said bars spaced from the inner ends of said slots, placing the bars of one set across the bars of the other set substantially at right angles to one another with the slots of one set in registration with, and facing, the slots of the other set and with the bars of both sets vertical to a common plane, and thereupon exercising pressure alone upon the free edges of said sets of bars in opposition to one another causing the bars to intersect one another with the edges in alinement with one another in their finally intersected position and simultaneously distorting and spreading outwardly portions of the bars of each set at their intersections laterally to extend into the orifices of the bars of the other set at their intersection to anchor the bars of one set to the bars of the other set.

2. A method of producing a grate comprising the steps of providing each bar of a plurality of bars with a series of rectangular slots extending inwardly from one edge thereof and a hole below each slot and in alignment therewith, placing one set of such bars upon another such set at an angle thereto and with the slotted edges of the bars facing each other and with the slots of the bars of one set in alignment with the slots of the bars of the other set, and forcing the two sets of bars toward each other to extrude those portions of the bars between the slots and the holes and so spread said portions to form a locking engagement within said holes.

3. The method of forming a grate of intersecting bars, comprising the steps of providing each of a plurality of bars with a series of holes correspondingly positioned adjacent and spread from an edge, placing one set of said bars upon another such set with said edges facing one another with the bars forming dihedral angles and with correspondingly positioned holes in alignment, and forcing the two sets of bars toward each other to extrude those portions of the bars between the holes and the facing edges of said bars and to spread said fractured portions to form a locking engagement within said holes.

4. In a grate being composed of bars having a plurality of slots receding from one edge and intermittently spaced from one another and openings in said bars below said slots and aligned therewith with portions of the bar being disposed between each slot and each opening associated therewith, said grate comprising a set of said bars extending longitudinally and a set of said bars extending laterally, both sets of bars extending vertically with respect to a common plane, the bars of one set having their slots in register with and facing the slots of the other set to define positions of intersection of the respective sets, the bars of one set crossing and partially intersecting the bars of the other set at an angle to one another at the positions defined by the slots, the portions of each bar between the slot and its aligned opening extending into the opening of the bar intersecting therewith whereby said bars are locked together.

5. In a grate being composed of bars having a plurality of holes spaced along one edge thereof and intermittently spaced from one another with portions of the bar being disposed between each opening and said edge of the bar, said grate comprising a set of said bars extending longitudinally and a set of said bars extending laterally, both sets of bars extending vertically with respect to a common plane, the bars of one set having their holes in register with and facing the holes of the other set to define positions of intersection of the respective sets, the bars of one set crossing and partially intersecting the bars of the other set at substantially right angles at the positions defined by the holes, and parts of said portion of each bar between the hole and said edge thereof extending into the hole of the bar intersecting therewith whereby said bars are locked together.

References Cited in the file of this patent
UNITED STATES PATENTS

| | | |
|---|---|---|
| 2,050,993 | Bush | Aug. 11, 1936 |
| 2,241,952 | Lachman | May 13, 1941 |
| 2,396,735 | Leigh | Mar. 19, 1946 |
| 2,614,827 | Peach et al. | Oct. 21, 1952 |
| 2,641,825 | Adams | June 16, 1953 |
| 2,680,501 | Cunningham | June 8, 1954 |
| 2,840,200 | Wong | June 24, 1958 |

FOREIGN PATENTS

| | | |
|---|---|---|
| 343,456 | Great Britain | Feb. 12, 1931 |
| 520,220 | Canada | Jan. 3, 1956 |

OTHER REFERENCES

American City Publication, Nov. 1940, page 133.